Patented July 11, 1933

1,918,187

UNITED STATES PATENT OFFICE

JOSEF KIRNER, OF STUTTGART, GERMANY, ASSIGNOR TO AKTIEBOLAGET SVENSKA KULLAGERFABRIKEN, OF GOTTENBORG, SWEDEN

METHOD OF MAKING BEARING MATERIAL

No Drawing. Application filed May 12, 1932, Serial No. 610,999, and in Germany May 15, 1931.

My invention refers to materials adapted for use in the construction of bearings and other parts of machinery and one of its objects is to provide means for producing a material which combines mechanical strength with a certain porosity, whereby it is enabled to take up oil or other lubricants.

It has already been suggested to produce a material adapted for the construction of bearings and other parts of machinery from artificial resin, such as a product of condensation from phenol and formaldehyde, in which textile fibres were embedded in order to increase the mechanical strength of the shapes formed from such material. The fibres thus embedded in the material were found to be absorptive, to a certain extent, for oil or other lubricants, which rendered such material particularly suitable for use in the construction of bearings.

It has now been found that the lubricating capacity of such bearings does not suffice inasmuch as the absorptive power of the fibres embedded in the artificial resin or the like is insufficient.

According to the present invention I embed in the basic material, which may for instance be an artificial resin, but also a low melting metal or alloy or some other suitable fusible substance, fibres or fibrous material imbibed or filled with a soluble substance, which, after the material has been moulded or shaped, can be extracted, at least partly, by acting thereon with suitable solvents, such as for instance water.

By thus proceeding I succeed in keeping the pores in or between the fibres open for the entrance of lubricant, because once the fibres are filled with the soluble substance, they cannot be compressed completely on being embedded in the basic material, such as artificial resin or low melting metal, nor can the fused basic material enter the pores in or between the fibres and thereby clog them. The soluble substance, with which the fibres have been impregnated, being readily removable by dissolution, the porous character of the fibres embedded in the basic material is restored and the fibres thereby rendered capable of absorbing greater quantities of lubricant.

Obviously the material obtained in accordance with the present invention will be more suitable for the construction of bearings and other parts of machinery requiring lubrication, than similar materials hitherto on the market, which also contained fibres.

In practising my invention I may for instance impregnate loose fibres or fibrous material of any sort with a soluble substance. I may use any suitable vegetable, animal or mineral fibres, or fibres which were produced artificially. The fibres may be loose or may be spun and preferably cotton is used for this purpose, either in the form of loose fibres or fibrous masses or chords, ribbons, wicks or the like.

I impregnate these fibres with substances, which, while being more or less readily soluble in water or other solvents, are inert relative to the basic substance itself and to those construction materials, such as steel, cast iron, bronze etc., from which these parts cooperating with the bearing or other part of machinery, shall be made.

The substance to be incorporated in the fibres must be such, that it can be removed from the basic material by dissolution in a simple manner and that the solvent or solvents required for this purpose do not in any way deteriorate the basic material itself nor the parts of machinery intended to cooperate with this material.

I may impregnate the fibrous masses with the soluble substance by placing the fibres in a solution of this substance, but I may also impregnate the fibres with viscous or fused substances. If necessary, the fibres impregnated with the soluble substance may be dried before being embedded in the basic material, which may be dissolved or fused for this purpose.

Obviously, any readily soluble substance, which is inert with regard to the basic material and the parts cooperating therewith, may be used for impregnating the fibres. Merely by way of example soda (sodium carbonate) may be named as one of the many inorganic substances and sugar as one of the many organic substances with which the fibres may be impregnated. Obviously all neutral inorganic and organic salts and other compounds and many salts and compounds having a slightly acid or alkaline reaction may also be used as soluble fillers.

In the case of soda or sugar water may be used for dissolving and extracting the filler and the water which has thus entered the fibres may be extracted therefrom by treating the material containing the fibres with boiling oil.

The new material thus obtained or the moulded or otherwise shaped article made from this material by pressing, stamping, turning or the like, may be treated with the solvent.

By the action of the solvent those parts of the fibres nearest to the surface will be extracted and will now present pores for the reception of a suitable lubricant, such as oil or grease.

Obviously instead of artificial resin or other plastic masses of a similar nature, the readily fusible metals or alloys hitherto used in the construction of the so-called oil-less bearings, may with advantage be treated in accordance with the present invention.

In impregnating the fibres, I may place loose fibres or spun threads or woven or knitted fabric in a slightly heated solution of soda, sugar or the like, which may be substantially saturated. The fibres having absorbed the dissolved substance, are then dried by applying heat and embedded in the basic material in a manner well known to those skilled in the art.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The method of producing a material adapted for use in the construction of bearings and other parts of machinery comprising embedding in a basic material fibres impregnated with a readily soluble inert substance permitting the basic material to solidify, subsequently removing part of the soluble substance by dissolution and replacing it by a lubricant.

2. The method of producing a material adapted for use in the construction of bearing parts of machinery, comprising impregnating fibres with a solution of a readily soluble inert substance, then drying such fibres, then embedding such fibres in a solid basic material, then shaping such material, then applying thereto a solvent for the inert substance with which the said fibres are impregnated for removing at least a part of such substance, and thereafter acting upon the article under treatment with a hot lubricant.

3. The method of producing a material adapted for use in the construction of bearing parts of machinery, comprising impregnating fibres with a solution of an inert substance readily soluble in water, then drying such fibres, then embedding such fibres in a solid basic material, and then applying water for dissolving the inert substance with which the said fibres are impregnated and removing at least a part of such substance.

4. The method of producing a material adapted for use in the construction of bearing parts of machinery, comprising impregnating fibres with a solution of a readily soluble inert substance, then drying such fibres, then embedding such fibres in a plastic mass and then removing by dissolution a part at least of the inert substance with which the said fibres are impregnated.

5. The method of producing a material adapted for use in the construction of bearing parts of machinery, comprising impregnating fibres with a solution of a readily soluble inert substance, then drying such fibres, then embedding such fibres in a mass of artificial resin and then removing by dissolution a part at least of the inert substance with which the said fibres are impregnated.

6. The method of producing a material adapted for use in the construction of bearing parts of machinery, comprising impregnating fibres with a solution of a readily soluble inert substance, then drying such fibres, then embedding such fibres in a low melting metallic mass and then removing by dissolution a part at least of the inert substance with which the said fibres are impregnated.

In testimony whereof I affix my signature.

JOSEF KIRNER.